Nov. 12, 1935.   E. G. HEDMAN   2,021,061
BEARING FOR WEIGHING SCALES AND THE LIKE
Original Filed Nov. 2, 1931

Inventor,
Erik Gustaf Hedman,
by Walter P. Geyer
Attorney.

Patented Nov. 12, 1935

2,021,061

UNITED STATES PATENT OFFICE 2,021,061

BEARING FOR WEIGHING SCALES AND THE LIKE

Erik Gustaf Hedman, Buffalo, N. Y.

Original application November 12, 1931, Serial No. 574,573. Divided and this application October 9, 1933, Serial No. 692,762

2 Claims. (Cl. 308—2)

This invention relates to certain new and useful improvements in pivots or bearings which have been designed more particularly for use in connection with weighing apparatus and like sensitive instruments, this application being a division of my copending application on Automatic weighing scale, Serial No. 574,573, filed November 12, 1931.

It is one of the objects of my invention to provide a knife-edge pivot or bearing, which, while simple, compact and inexpensive in construction, is so designed as to be effectually held against lateral displacement and in true and proper alinement at all times, and which is practically dust, rust and dirt-proof and assures extreme accuracy in scale readings and in other instrumentalities to which it may be applied.

A further object of the invention is the provision of a fulcrum or pivot construction of this character whose elements are so constructed as to automatically adjust themselves to their true bearing position and wherein the friction between such elements is reduced to a minimum and is practically nil.

Other features of the invention reside in the structural arrangement of parts hereinafter described and particularly pointed out in the appended claims.

In the accompanying drawing:—

Figure 1:
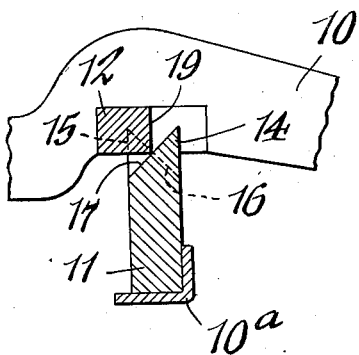
Figure 2:
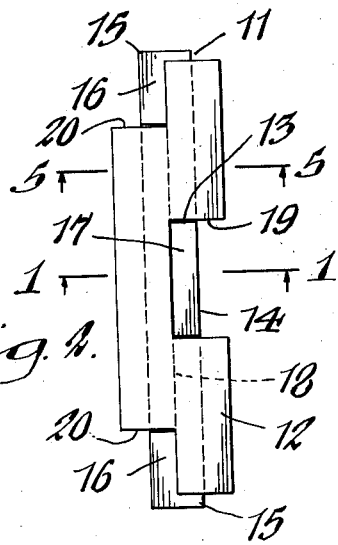
Figure 3:
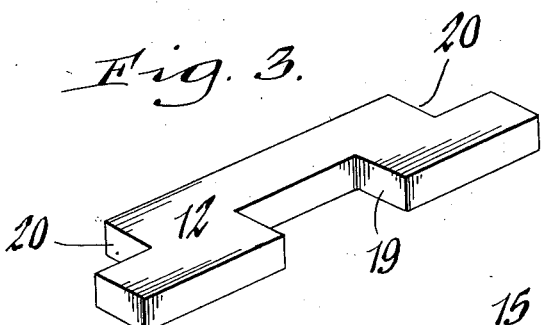
Figure 5:
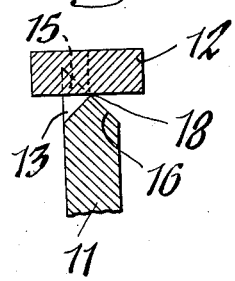
Figure 4:
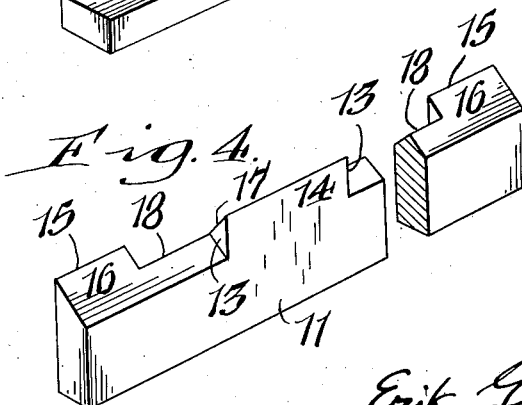

Figure 1 is a cross section of my improved knife-edge pivot or bearing associated with a scale-beam or lever, and taken substantially in the plane of line 1—1, Figure 2. Figure 2 is a top plan view of the bearing elements in operative relation. Figures 3 and 4 are detached perspective views of the rocking or movable bearing element and the fixed pivot element, respectively. Figure 5 is a cross section taken on line 5—5, Figure 2.

Similar characters of reference indicate corresponding parts throughout the several views.

By way of example, I have shown my knife-edge pivot or bearing in connection with a scale-beam or lever 10, although it is to be understood that the invention is applicable to other apparatus and mechanisms where accurate and sensitive pivot connections or fulcrums are desired.

The bearing or fulcrum is in the form of a knife-edge pivot preferably consisting of two members or bars 11 and 12 made from substantially flat or bar stock and disposed or mounted at substantially right angles to each other in simulation to the letter T, the bar 11 constituting the upright or relatively fixed pivot member or element and the bar 12 constituting the rocking or movable bearing member or element which is disposed centrally over the adjoining edge of the companion bar. These bars are secured in any suitable manner to a support 10a and to the pivoted element or lever 10, respectively, and are interconnected with each other to permit a free rocking action of the one relative to the other about a line or knife-edge contact while they are at the same time held against relative displacement both lengthwise and crosswise of the bars. To this end, the pivot bar 11 is provided in its top edge with a plurality of notches 13 which form resulting upstanding tongues 14 and 15. In the example shown in the drawing, the bar 11 is provided with the substantially central tongue 14 and the end tongues 15, the latter being provided with alining inclined or beveled bearing faces 16 inclined in one direction from one side edge to the opposite side edge of the bar in the manner shown in Figures 1, 4 and 5. The intermediate tongue 14 has a similar beveled face 17 inclined in the opposite direction to those of the tongues 15 and at substantially the same angle to the vertical and likewise extending from one side edge to the opposite side edge of the box. The bottom edges 18 of the notches 13 are knife-like or V-shape and are formed by continuing the beveled faces 16 and 17 coextensively across the bottoms of the notches and lengthwise of the bar in the manner shown in Figures 4 and 5, the resulting beveled faces 18 meeting in a line intersecting a plane passing substantially vertically through the longitudinal center of the bar 11.

The movable bearing member 12 is provided in one of its longitudinal edges with a central, laterally-facing notch 19 and in its opposite longitudinal edge with reversely-facing end notches 20 which are adapted to register or mate with the corresponding tongues 14 and 15, respectively, of the pivot bar 11. The bottom sides of the notches 19 and 20 of the bar 12 are in approximately longitudinal alinement and are located midway or centrally of the bar, as can be clearly seen in Figure 2. In the assembled position of the knife-edge pivot members, the bar 12 overlies the companion bar 11 and those bottom face-portions of the latter between the notches 19 and 20 thereof contact with the knife-edges 18 of the bar-notches 13, and the bottom corner edges of the bar-notches 19 and 20 have alined contact with the corresponding reversely beveled faces 17 and 16, respectively, of the bar 11, whereby a continuous line or knife-edge fulcrum is provided between the bars.

By this construction, a frictionless, free-moving and sensitive pivot is provided wherein the companion elements 11, 12 are reliably held by their intermeshing notches and tongues against relative endwise displacement, and are effectually and positively held against transverse or sidewise displacement by those same tongues and grooves in combination with the line contact between the bottom corners of the bar-notches 19, 20 and the oppositely-beveled faces of the bar 11. It is to be understood that these pivot bars may be provided with any number of intermeshing notches and grooves, depending on the length and size of the bearing fulcrum desired.

I claim as my invention:—

1. A knife edge pivot, comprising an upright pivot bar notched at its upper edge and having oppositely-inclined beveled faces along the same forming knife-like edges medially at the bottoms of said notches and alternately disposed beveled faces adjoining them and extending from one side to the other of said bar, and an overhanging bar having laterally-opening notches in its opposite side edges, the bottoms of said overhanging bar notches being in substantially the same straight line, and the bottom face of the overhanging bar and the corresponding corner edges of its notches contacting with the knife-like edges of said upright bar-notches and with the beveled faces adjoining them, respectively.

2. In a knife-edge pivot, a pivot member having a plurality of longitudinally-spaced beveled faces inclined alternately in opposite directions, and upwardly-facing, substantially knife-like edges formed between said beveled faces with their edges intersecting substantially medially thereof, and a bearing disposed in overlying relation to said pivot member and having a plurality of oppositely-facing notches therein, the lower edges of the notches contacting with the corresponding beveled edges of the pivot member and those face portions of the bearing between said notches contacting the knife-like edges of said pivot member.

ERIK GUSTAF HEDMAN.